(12) United States Patent
Okishima et al.

(10) Patent No.: US 11,382,320 B2
(45) Date of Patent: Jul. 12, 2022

(54) FISHING SWIVEL

(71) Applicant: GLOBERIDE, Inc., Tokyo (JP)

(72) Inventors: Yukio Okishima, Tokyo (JP); Kouhei Ueta, Tottori (JP)

(73) Assignee: GLOBERIDE, Inc., Tokyo (JP)

( * ) Notice: Subject to any disclaimer, the term of this patent is extended or adjusted under 35 U.S.C. 154(b) by 83 days.

(21) Appl. No.: 16/959,851

(22) PCT Filed: Jan. 7, 2019

(86) PCT No.: PCT/JP2019/000103
§ 371 (c)(1),
(2) Date: Jul. 2, 2020

(87) PCT Pub. No.: WO2019/135413
PCT Pub. Date: Jul. 11, 2019

(65) Prior Publication Data
US 2020/0367481 A1   Nov. 26, 2020

(30) Foreign Application Priority Data
Jan. 5, 2018  (JP) .............................. JP2018-000867

(51) Int. Cl.
*A01K 91/03*   (2006.01)
*A01K 91/14*   (2006.01)

(52) U.S. Cl.
CPC .............. *A01K 91/03* (2013.01); *A01K 91/14* (2013.01)

(58) Field of Classification Search
CPC ...... A01K 91/03; A01K 91/14; A01K 91/047; A01K 91/04
See application file for complete search history.

(56) References Cited

U.S. PATENT DOCUMENTS 2,137,016 A * 11/1938 Franzen ................. A01K 91/03
43/43.13
3,427,691 A *  2/1969 Johnston ................. F16B 45/04
24/374

(Continued)

FOREIGN PATENT DOCUMENTS

CN          1427986 A     7/2003
JP          51-122095    10/1976

(Continued)

OTHER PUBLICATIONS

First Office Action dated Jul. 21, 2021, issued in corresponding Chinese Patent Application No. 201980007289.0, with English translation (17 pgs.).

(Continued)

*Primary Examiner* — Timothy D Collins
*Assistant Examiner* — Maria E Graber
(74) *Attorney, Agent, or Firm* — K&L Gates LLP (57) ABSTRACT

A fishing swivel for connecting a main fishing line and a leader is provided. The fishing swivel includes a first connecting portion connected with the main line, a second connecting portion connected with the leader, and a main body rotatably coupled to the first connecting portion and the second connecting portion. The first connecting portion has a first contact portion that contacts the main body, the second connecting portion has a second contact portion that contacts the main body, and the main body has a main body contact portion that contacts the first contact portion and the second contact portion. A plating layer containing fluororesin is provided on surfaces of the first contact portion, the second contact portion, and the main body contact portion.

15 Claims, 6 Drawing Sheets

(56) References Cited

U.S. PATENT DOCUMENTS

| | | | | |
|---|---|---|---|---|
| 3,705,450 | A | * 12/1972 | Morisaki | F16C 33/206 |
| | | | | 428/545 |
| RE31,096 | E | * 12/1982 | Johnston | A01K 91/03 |
| | | | | 24/374 |
| 4,552,481 | A | * 11/1985 | Bluett | F16G 15/08 |
| | | | | 403/165 |
| 5,381,650 | A | 1/1995 | Garrett | |
| 5,461,820 | A | 10/1995 | Sorola | |
| 2004/0094013 | A1 | 5/2004 | Gotoh | |
| 2007/0031183 | A1 | 2/2007 | Sim | |
| 2014/0231570 | A1 | 8/2014 | Ikuta et al. | |
| 2014/0255722 | A1 | * 9/2014 | Nagarajan | C23C 18/1653 |
| | | | | 428/626 |

FOREIGN PATENT DOCUMENTS

| | | | | |
|---|---|---|---|---|
| JP | | 59-092671 A | 6/1984 | |
| JP | | 61-234727 A | 10/1986 | |
| JP | | H06-90645 A | 4/1994 | |
| JP | | 9-172921 A | 7/1997 | |
| JP | | 11-000088 | * 1/1999 | A01K 91/047 |
| JP | | 11-000088 A | 1/1999 | |
| JP | | 2000-345384 A | 12/2000 | |
| JP | | 2002238410 A | 8/2002 | |
| JP | | 2014155470 A | 8/2014 | |
| JP | | 2015-092009 A | 5/2015 | |
| KR | | 1019970032381 A | 7/1997 | |
| TW | | 201247097 A | 12/2012 | |

OTHER PUBLICATIONS

International Search Report dated Mar. 19, 2019 issued in corresponding International Patent Application No. PCT/JP2019/000103 with English translation.

Non-final Office Action dated Aug. 17, 2021, issued in corresponding Japanese Patent Application No. 2019-563987 with English translation (6 pgs.).

Sasame Fisherman's Energy 2014—Fishing Tackle Catalog, Sasame Hooks, Ltd. Jul. 1, 2014, pp. 126.

International Preliminary Report on Patentability dated Apr. 20, 2020 issued in corresponding International Application No. PCT/JP2019/000103 with English translation.

Extended European Search Report dated May 14, 2021, issued in corresponding European Patent Application No. 19735958.1 (22 pgs.).

Second Office Action dated Mar. 3, 2022 issued in corresponding Chinese Patent Application No. 201980007289.0, with English translation (16 pgs.).

Office Action for related Korean Application No. 10-2020-7018900; action dated May 19, 2022; (14 pages).

* cited by examiner

FISHING SWIVEL

CROSS-REFERENCE TO RELATED APPLICATIONS

This application is the U.S. National Phase Application of PCT/JP2019/000103, filed Jan. 7, 2019, which claims the benefit of priority from Japanese Patent Application Serial No. 2018-000867, filed Jan. 5, 2018. The contents of each is incorporated herein by reference in entirety.

TECHNICAL FIELD

The present invention relates to a fishing swivel. A swivel is also called as Sarukan or Yorimodoshi in Japanese.

BACKGROUND

Swivels are used as a connector for connecting a fishing main line and a fishing leader. A barrel-shaped swivel having a barrel-shaped body is known as one type of swivels. The barrel-shaped swivel has a pair of rings rotatably attached to ends of the barrel-shaped body respectively. The ring is prevented from coming off the body by a stopper. A fishing line is connected to one of the pair of rings and a leader is connected to the other of the pair of rings.

Patent Literatures 1 and 2 disclose conventional swivels. A swivel described in Patent Literature 1 includes a swivel main body, a ring for a main line provided at one end of the swivel main body, and a ring for a leader provided at the other end of the swivel body. A swivel described in Patent Literature 2 includes a first coupling portion coupled to a main line, a second coupling portion coupled to a leader, a string-shaped attachment portion whose ends are rotatably coupled to the first coupling portion and the second coupling portion respectively, and two cups provided therebetween.

RELEVANT REFERENCES

List of Relevant Patent Literature

Patent Literature 1: Japanese Patent Application Publication No. Hei 9-172921
Patent Literature 2: Japanese Patent Application Publication No. Hei 11-000088

SUMMARY

A swivel is designed to allow a main line and a leader to freely rotate relative to the swivel in order to prevent the main line and the leader from twisting when a hook rig is used during fishing. However, in conventional swivels, friction occurs between an inner peripheral surface of the swivel body and an outer peripheral surface of a metal ring to which the main line or the leader is attached, and thus its rotation performance may not be sufficient. Further, the conventional swivels do not have a sufficient durability.

The swivel described in Patent Literature 2 improved the rotation performance by using two cups, but friction between inner peripheral surfaces of the two cups and outer peripheral surfaces of the metal ring and the mounting portion still occur. Therefore it still cannot achieve a high rotation performance.

In view of the above drawbacks, embodiments of the present invention endeavor to provide a fishing swivel with high rotation performance, excellent durability, and reduced manufacturing cost.

Other objects of the embodiments of the present disclosure will be apparent with reference to the entire description in this specification.

A fishing swivel according to one aspect of the present patent application is a fishing swivel for connecting a main fishing line and a leader. The fishing swivel includes a first connecting portion connected with the main line, a second connecting portion connected with the leader, and a main body rotatably coupled to the first connecting portion and the second connecting portion. The first connecting portion has a first contact portion that contacts the main body, the second connecting portion has a second contact portion that contacts the main body, and the main body has a main body contact portion that contacts the first contact portion and the second contact portion. A plating layer containing fluororesin is provided on surfaces of the first contact portion, the second contact portion, and the main body contact portion.

In the fishing swivel, the surfaces of the first contact portion, the second contact portion, and the main body contact portion may be pickled.

In the fishing swivel, the main body may be formed in a tubular shape. In the fishing swivel, the main body contact portion may be formed on an inner peripheral surface of the main body, the first contact portion may be formed on an outer peripheral surface of the first connecting portion, the second contact portion may be formed on an outer peripheral surface of the second connecting portion, and the first contact portion and the second contact portion may rotatably contact the inner peripheral surface.

In the fishing swivel, the main body contact portion may be formed at each end of the main body, and each end of the main body may be formed such that the end surrounds the first contact portion or the second contact portion.

In the fishing swivel, the plating layer may be also provided on a surface of the first connection portion other than the first contact portion, a surface of the second connection portion other than the second contact portion, and a surface of the main body other than the main body contact portion.

In the fishing swivel, thicknesses of the plating layer on the surfaces of the first contact portion, the second contact portion, and the main body contact portion may be greater than thicknesses of the plating layer in other portions.

In the fishing swivel, at least one convex portion may be formed on an outer peripheral surface of the first connecting portion or the second connecting portion, and the first contact portion or the second contact portion may be a part of the convex portion.

In the fishing swivel, the fluororesin contained in the plating layer may be PTFE (polytetrafluoroethylene or tetrafluoroethylene resin).

In the fishing swivel, the first connecting portion, the second connecting portion, and the main body may be made of metal.

In the fishing swivel, the first connecting portion, the second connecting portion, and the main body may be made of brass or stainless steel.

A fishing swivel according to another aspect of the invention includes a first connecting portion connected with a fishing main line, a first main body rotatably coupled to the first connecting portion, a second connecting portion connected with a leader, a second main body rotatably coupled to the second connecting portion, and an intermediate connecting portion connecting the first main body and the second main body. In this fishing swivel, the first connecting portion has a first contact portion that contacts the first main body, the second connecting portion has a second contact portion that contacts the second main body, the intermediate connection portion has a third contact portion that contacts the first main body and a fourth contact portion that contacts the second main body, the first main body has a first main body portion contact portion that contacts the first contact portion and the third contact portion, and the second main body has a second main body portion contact portion that contacts the second contact portion and the fourth contact portion. A plating layer containing fluororesin is provided on surfaces of the first contact portion, the second contact portion, the third contact portion, the fourth contact portion, the first main body contact portion, and the second main body contact portion.

According to aspects of the invention, it is possible to provide a fishing swivel having high rotation performance and excellent durability.

DESCRIPTION OF THE EMBODIMENTS

Various embodiments of the present invention will be hereinafter described with reference to the drawings. In the drawings, like constituent elements are denoted by like reference numerals throughout. It should be noted that the drawings do not necessarily appear to an accurate scale for the sake of convenience of explanation.

A fishing swivel 1 according to an embodiment of the invention will be hereinafter described with reference to FIG. 1.

Figure 1:
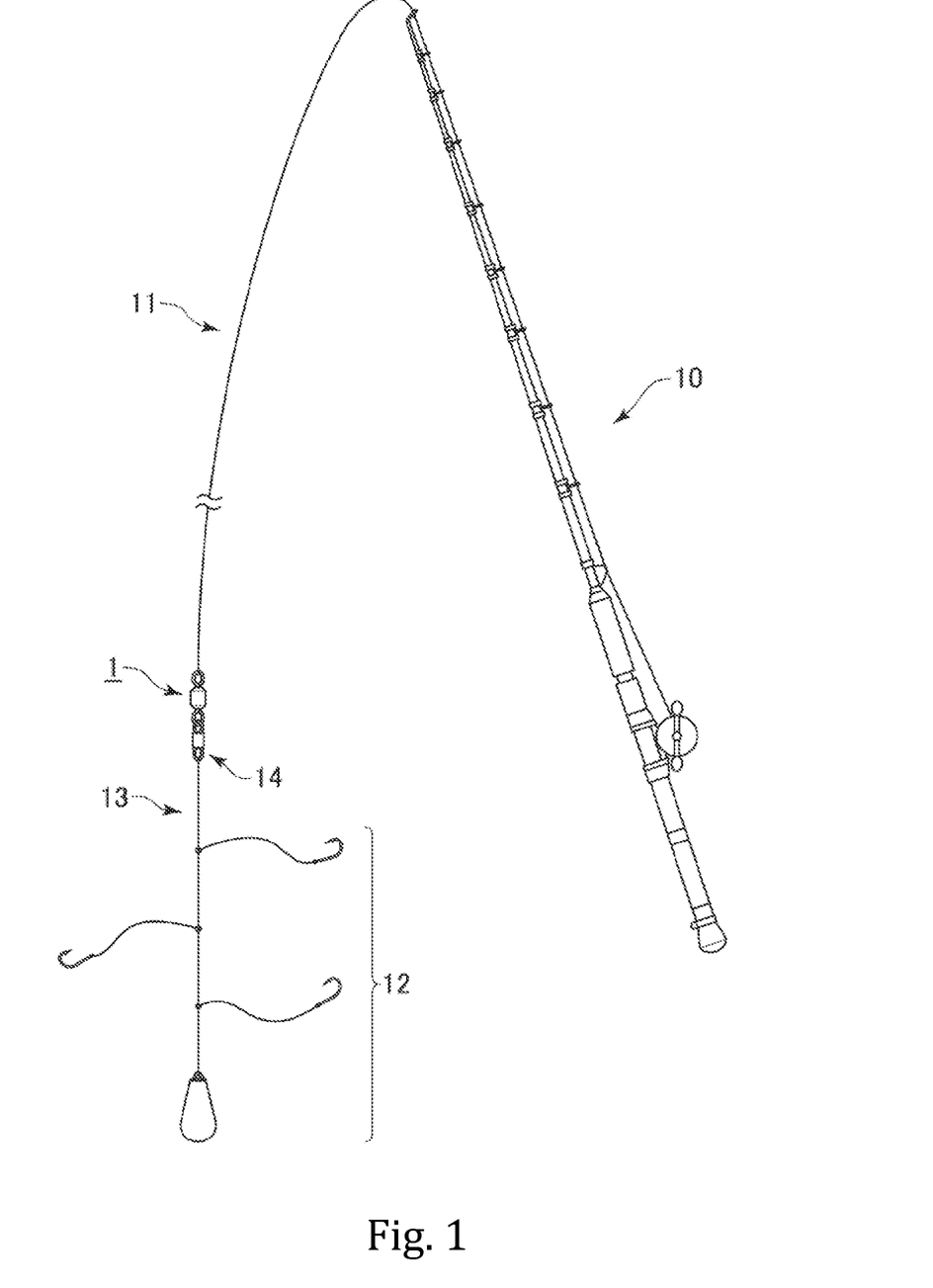
FIG. 1 is illustrates a fishing tackle where a fishing swivel 1 according to an embodiment of the invention may be used.

As shown in FIG. 1, the fishing swivel 1 is connected to a tip of a main line (fishing line) 11 extending from a fishing rod 10 when in use. One or more than one hook rig 12 may be coupled to the fishing swivel 1 via a snap 14. Various known rigs can be used as the hook rig 12.

As shown in FIG. 1, a leader (snood) 13 is connected via a snap 14 to an end of the fishing swivel 1 opposite to the end on which the main line 11 is connected. The fishing swivel 1 rotatably connects the main line 11 and the leader 13. The fishing swivel 1 can prevent twisting of the main line 11 and the leader 13 during use of the hook rig 12.

Figure 2A:
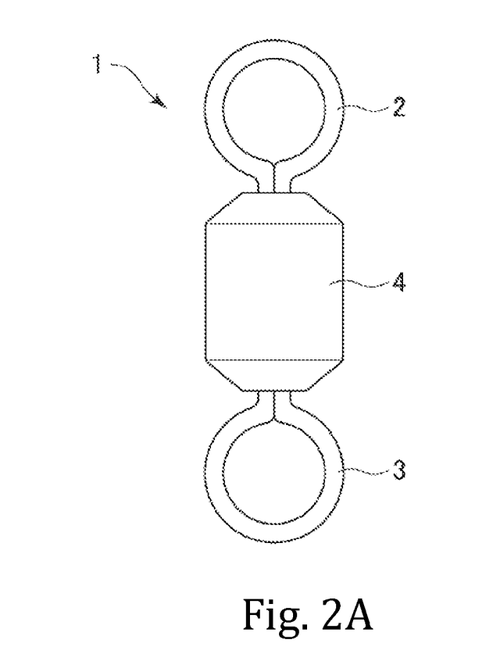
FIG. 2A is a front view of the fishing swivel 1 according to the embodiment of the invention.

Next, the fishing swivel 1 will be further described with reference to FIGS. 2A and 2B. The fishing swivel 1 includes a first connecting portion 2 connected to the main line 11, a second connecting portion 3 connected to the leader 13, and a main body 4 that rotatably couples the first connecting portion 2 and the second connecting portion 3. The first connecting portion 2 may be directly connected with the main line 11 or may be indirectly connected to the main line 11 via another member. The second connecting portion 3 may be directly connected with the leader 13 or may be indirectly connected to the leader 13 via another member (for example, the snap 14).

In the illustrated embodiment, the first connecting portion 2 includes a ring-shaped head 2a to which the main line is tied, a stopper 2c housed in the main body 4, and a coupling portion 2b that couples the head 2a and the stopper 2c. The second connecting portion 3 includes a ring-shaped head 3a to which the leader is tied, a stopper 3c housed in the main body 4, and a coupling portion 3b that couples the head 3a and the stopper 3c. The head 2a of the first connecting portion 2 and the head 3a of the second connecting portion 3 have a ring shape. However, the shapes of the head 2a of the first connecting portion 2 and the head 3a of the second connecting portion 3 are not limited to the ring shape. The stopper 2c of the first connecting portion 2 is housed in the main body 4 such that the first connecting portion 2 does not drop from the main body 4. The stopper 3c of the second connecting portion 3 is housed in the main body 4 such that the second connecting portion 3 does not drop from the main body 4. The first connecting portion 2 may have any shape to which the main line 11 can be connected and which can be rotatably connected to the main body 4. The second connecting portion 3 may have any shape to which the leader 13 can be connected and which can be rotatably connected to the main body 4. In the illustrated embodiment, the first connecting portion 2 and the second connecting portion 3 have the same shape and the same size. In other embodiments, the first connecting portion 2 and the second connecting portion 3 may have different shapes and/or different sizes from each other. The first connecting portion 2, the second connecting portion 3, and the main body 4 may be made of brass, stainless steel, or any other metal.

In the illustrated embodiment, the main body 4 is formed in a tubular shape. The main body 4 is configured to rotatably support the first connecting portion 2 and rotatably support the second connecting portion 3. The main body 4 may have any structure, shape, and size provided that it can rotatably support the first connecting portion 2 and rotatably support the second connecting portion 3.

Figure 2B:
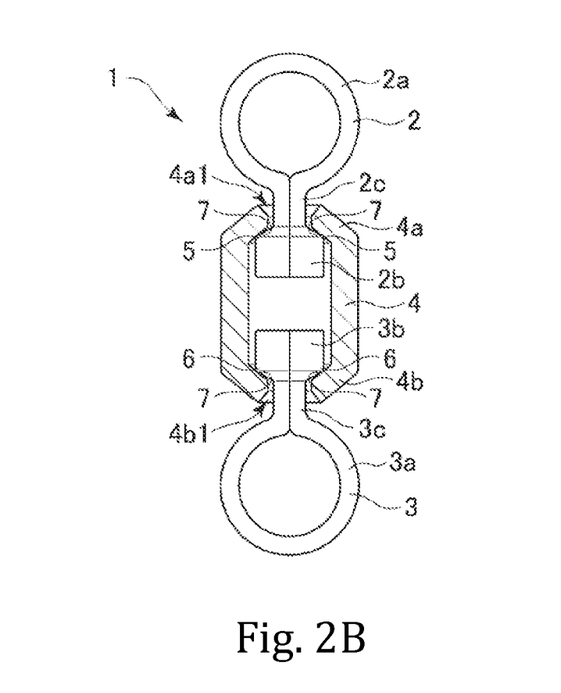
FIG. 2B is a sectional view of the fishing swivel 1 according to the embodiment of the invention.

As shown in FIG. 2B, the first connecting portion 2 contacts the main body 4 at a first contact portion 5. The second connecting portion 3 contacts the main body 4 at a second contact portion 6. A part of the main body 4 that contacts the first contact portion 5 and a part of the main body 4 that contacts the second contact portion 6 are collectively referred to as a main body contact portion 7. In other words, the main body 4 contacts the first connecting portion 2 and the second connecting portion 3 at the main body contact portion 7.

In the fishing swivel 1 according to the embodiment of the invention, a surface of the first contact portion 5 of the first connecting portion 2, a surface of the second contact portion 6 of the second connecting portion 3, and a surface of the main body contact portion 7 of the main body 4 are provided with a plating layer containing a fluororesin.

When the fishing swivel 1 according to the embodiment is manufactured, a base material for the first connecting portion 2, the second connecting portion 3 and the main body 4 is prepared, and surfaces of the base material are pickled to obtain smooth surfaces. The pickling treatment on the base material is performed by immersing the base material in an acidic solution (sulfuric acid, hydrochloric acid or the like) for a predetermined time. In addition to the pickling treatment, the base material may be subjected to a smoothing treatment such as deburring (barrel processing) with a barrel or the like, chemical polishing other than pickling, and/or any other treatment. The pickling treatment and other smoothing treatment may be omitted. A fluororesin-containing plating layer is subsequently provided on the base material that has been pickled. In one embodiment, the fluororesin-containing plating layer is a composite plating layer obtained by dispersion and eutectoid of particles of fluororesin in a plating solution. As the plating solution, for example, a nickel plating solution is used. Fluororesin in the fluororesin-containing plating layer is, for example, polytetrafluoroethylene (PTFE). The fluororesin-containing plating layer may include two layers: an electroless nickel plating layer formed by electroless nickel plating; and an electrolytic nickel plating layer formed by electrolytic nickel plating. The electrolytic plating layer can make the surfaces of the first connecting portion 2, the second connecting portion 3, and the main body 4 smoother. The thickness of the electroless nickel plating layer is 1 to 2 μm, and the thickness of the electrolytic nickel plating layer is about 1 to 2 μm. In another embodiment, the fluororesin-containing plating layer may be formed by mirror surface plating. Vanadium may be mixed in a plating bath used for forming the fluororesin-containing plating layer. It is possible to enhance the hardness of the plating layer by forming it with the vanadium-mixed plating bath.

Figure 3A:
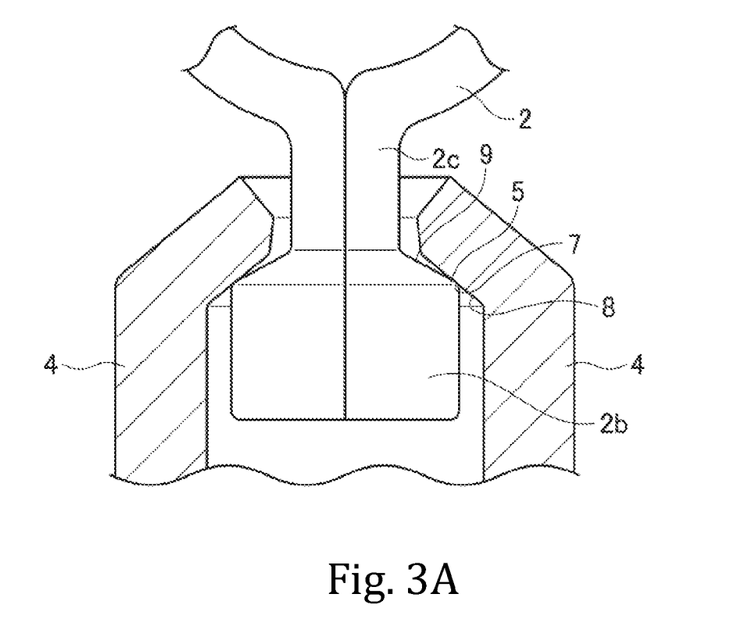
FIG. 3A is an enlarged sectional view of the fishing swivel 1 of FIG. 2B.
Figure 3B:
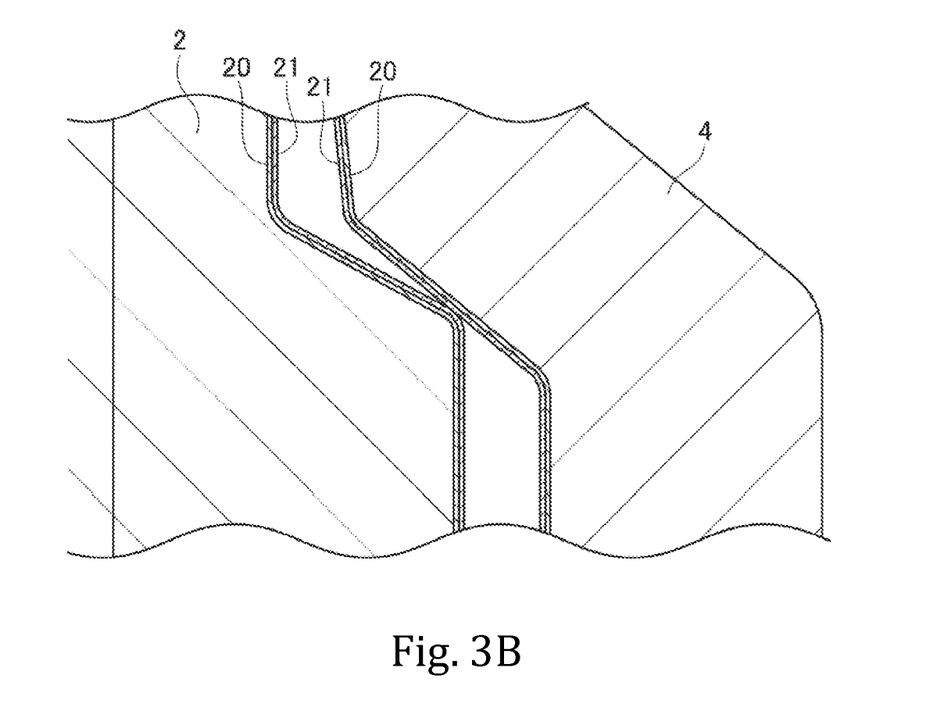
FIG. 3B is an enlarged sectional view of the fishing swivel 1 of FIG. 3A.

Next, with reference to FIGS. 3A and 3B, a contact portion between the first connecting portion 2 and the main body 4 will be described. FIG. 3A is an enlarged sectional view showing a part of FIG. 2B in an enlarged manner, and FIG. 3B is an enlarged sectional view showing a part of FIG. 3A. As shown in FIG. 3A, the fishing swivel 1 has the main body contact portion 7 on an inner peripheral surface of the main body 4, the first contact portion 5 on an outer peripheral surface 9 of the stopper 2b of the first connecting portion 2, and the second contact portion 6 on an outer peripheral surface 10 of the stopper 3b of the second connecting portion 3. When the first connecting portion 2 rotates, the first contact portion 5 of the first connecting portion 2 contacts the main body contact portion 7 of the main body 4. When the second connecting portion 3 rotates, the second contact portion 6 of the second connecting portion 3 contacts the main body contact portion 7 of the main body 4.

As shown in FIGS. 2B and 3A, in the fishing swivel 1 according to the embodiment of the invention, the main body contact portion 7 is formed on an upper end portion 4a and a lower end portion 4b of the main body 4. The upper end portion 4a of the main body 4 is formed around (to surround) the first contact portion 5, and the lower end portion 4b of the main body 4 is formed around (to surround) the second contact portion 6. The upper end portion 4a of the main body 4 is inclined toward a rotation axis of the first connecting portion 2. A leading edge of the upper end portion 4a of the main body 4 defines a through hole 4a1. The diameter of the through hole 4a1 is larger than the diameter of the stopper 2b. A leading edge of the lower end portion 4b of the main body 4 defines a through hole 4b1. The diameter of the through hole 4b1 is larger than the diameter of the stopper 3b. The upper end portion 4a and the lower end portion 4b of the main body 4 can be formed by press work. In the above described manner, the first connecting portion 2 and the second connecting portion 3 are prevented from coming off the main body 4.

In the embodiment of FIG. 3B, a base plating layer 20 on top of which the fluororesin-containing plating layer is formed is provided on the outer peripheral surface of the first connecting portion 2 and the inner peripheral surface of the main body 4. The base plating layer 20 is, for example, a nickel plating layer. The fluororesin-containing plating layer 21 is a plating layer containing fluororesin such as PTFE as described above. The base plating layer 20 and the fluororesin-containing plating layer 21 may be provided only on a part of the outer peripheral surface of the first connecting portion 2 or may be provided on the entire outer peripheral surface thereof. The base plating layer 20 and the fluororesin-containing plating layer 21 may be provided only on a part of the inner peripheral surface of the main body 4 or may be provided on the entire inner peripheral surface thereof. Although not shown, the base plating layer 20 and the fluororesin-containing plating layer 21 may be also provided on the inner peripheral surface of the second connecting portion 3 in the same manner. The base plating layer 20 may be omitted.

Figure 4:
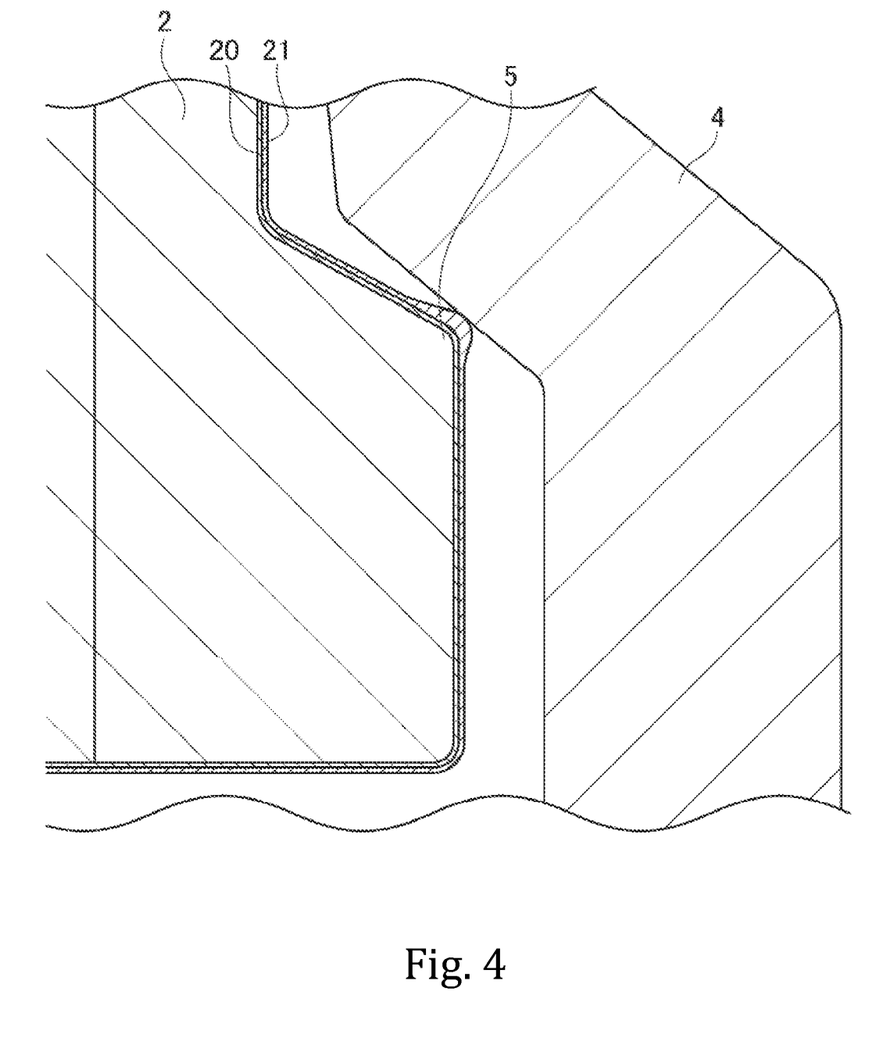
FIG. 4 is an enlarged sectional view of the fishing swivel 1 according to another embodiment of the invention.

The fluororesin-containing plating layer 21 may be formed such that it has a uniform thickness, or may be formed such that a part thereof has a larger thickness than the other parts. For example, as shown in FIG. 4, the fluororesin-containing plating layer 21 is formed such that the thickness in the first contact portion 5 of the first connecting portion 2 is greater than thicknesses in other portions. Although not shown, the fluororesin-containing plating layer 21 provided in the second connecting portion 3 may be formed such that the thickness in the second contact portion 6 of the second connecting portion 3 is greater than thicknesses in other portions thereof. Similarly, the fluororesin-containing plating layer 21 provided in the main body 4 may be formed such that the thickness in the main body contact portion 7 of the main body 4 is greater than thicknesses in other portions thereof. By increasing the thickness of the fluororesin-containing plating layer 21 provided in the first contact portion 5, the second contact portion 6 and the main body contact portion 7 where are likely to be worn, it is possible to further improve the durability of the fishing swivel 1.

The fishing swivel 1 according to another embodiment of the invention will be now described with reference to FIG. 5A. The fishing swivel 1 shown in FIG. 5A differs from the embodiment shown in FIG. 2 in the shape of the stopper 2b of the first connecting portion 2. In the fishing swivel 1 of FIG. 5A, the stopper 2b of the first connecting portion 2 has two convex portions 15 (or step portions). In the fishing swivel 1 shown in FIG. 5A, the stopper 3b of the second connecting portion 3 may also have two convex portions, like the stopper 2b. The number of convex portions 15 formed on the outer peripheral surface 9 of the first connecting portion 2 and the number of convex portions 15 formed on the outer peripheral surface 10 of the second connecting portion 3 are not limited to two. Any number of the convex portions 15 may be provided. In the fishing swivel 1 shown in FIG. 5A, the first connecting portion 2 contacts the main body 4 at corners of the convex portions 15. In other words, a part of the convex portion 15 provided on the first connecting portion 2 serves as the first contact portion 5. Similarly, when the second connecting portion 3 has a convex portion(s) similar to the convex portion(s) 15, the second connecting portion 3 contacts the main body 4 at a corner(s) of the convex portion(s). In other words, a part of the convex portion 15 provided on the second connecting portion 3 serves as the second contact portion 6. By reducing the contact area between the first connecting portion 2 or the second contact portion 6 and the main body 4 in this way, the rotation resistance can be reduced and the rotation performance can be further improved.

Figure 5A:
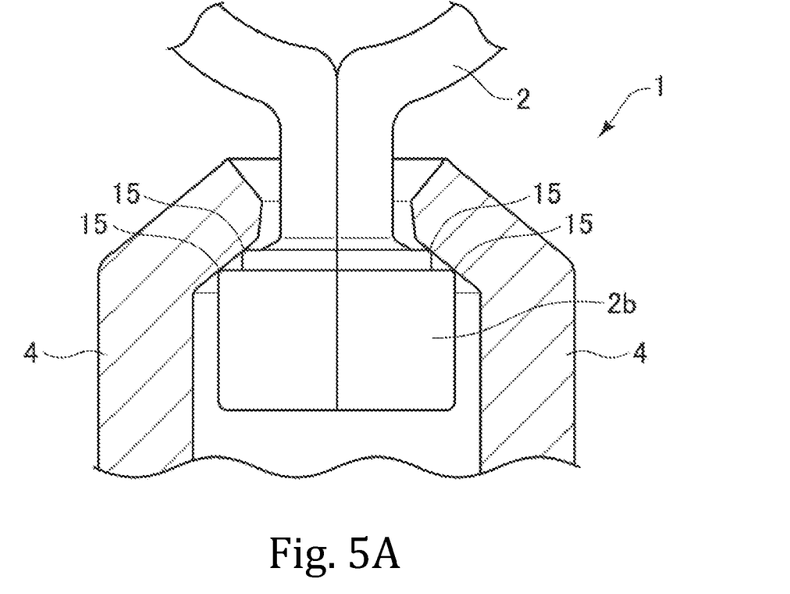
FIG. 5A is an enlarged sectional view of the fishing swivel 1 according to the embodiment of the invention.
Figure 5B:
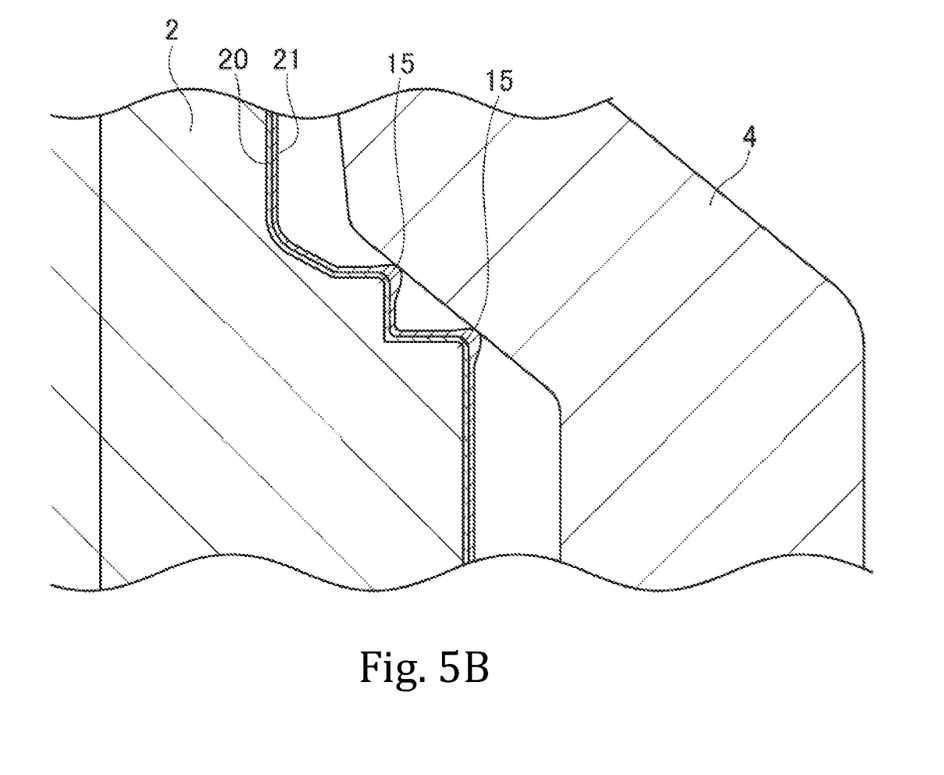
FIG. 5B is an enlarged sectional view of the fishing swivel 1 of FIG. 5A.

FIG. 5B is an enlarged sectional view of the fishing swivel 1 of FIG. 5A. As shown in FIG. 5B, the fluororesin-containing plating layer 21 may be formed such that the thickness in the convex portion 15 of the first connecting portion 2 is greater than thicknesses in other portions thereof. Although not shown, the thickness of the fluororesin-containing plating layer 21 provided in the second connecting portion 3 may be greater than thicknesses in other portions thereof. By increasing the thickness of the fluororesin-containing plating layer 21 provided in the portions where are likely to be worn, it is possible to further improve the durability of the fishing swivel.

Figure 6:
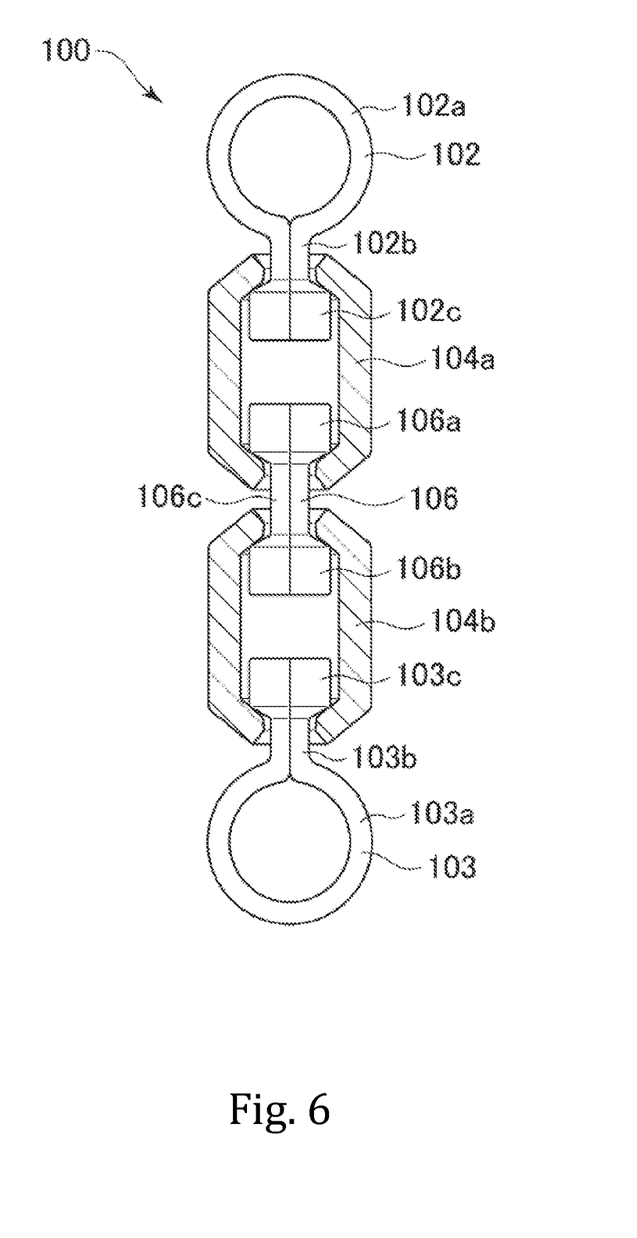
FIG. 6 is a sectional view of a fishing swivel according to yet another embodiment of the invention.

FIG. 6 is a sectional view of a fishing swivel 100 according to yet another embodiment of the invention. As illustrated, the fishing swivel 100 includes a first main body 104a and a second main body 104b that is connected in series with the first main body 104a. The first main body 104a rotatably couples an intermediate connecting portion 106 and a first connecting portion 102 to which a main fishing line is connected. The second main body 104b rotatably couples the intermediate connecting portion 106 and a second connecting portion 103 to which a leader is connected.

The first connecting portion 102 is configured similarly to the first connecting portion 2 described above, and the second connecting portion 103 is configured similar to the second connecting portion 3 described above. Specifically, the first connecting portion 102 includes a ring-shaped head 102a to which the main line is tied, a stopper 102c housed in the first main body 104a, and a coupling portion 102b that connects the head 102a and the stopper 102c. The second connecting portion 103 includes a ring-shaped head 103a to which the leader is tied, a stopper 103c housed in the second main body 104b, and a coupling portion 103b that connects the head 103a and the stopper 103c. The first main body 104a and the second main body 104b are configured in the same manner as the main body 4 described above.

The intermediate connecting portion 106 includes a first stopper 106a housed in the first main body 104a, a second stopper 106b housed in the second main body 104b, a coupling portion 106c for coupling the first stopper 106a and the second stopper 106b. The coupling portion 106c is disposed such that it penetrates a through hole of the first main body 104a and a through hole of the second main body 104b. A diameter of the first stopper 106a is larger than a diameter of the first main body 104a, and a diameter of the second stopper 106b is larger than a diameter of the second main body 104b. In this way, the first stopper 106a and the second stopper 106b are prevented from coming off the first main body 104a and the second main body 104b, respectively. The first stopper 106a and the second stopper 106b of the intermediate connecting portion 106 are configured similarly to the stopper 2b of the first connecting portion 2 (or the stopper 3b of the second connecting portion 3). Specifically, the first stopper 106a has a contact portion that contacts the first main body 104a, and the second stopper 106b has a contact portion that contacts the second main body 104b. These contact portions are configured similarly to the first contact portion 5 of the first connecting portion 2 (or the second contact portion 6 of the second connecting portion 3). More specifically, the fluororesin-containing plating layer 21 is provided on the contact portion of the first stopper 106a and the contact portion of the second stopper 106b.

A swivel in which two main bodies are connected in series, such as the swivel 100 shown in FIG. 6, is often called a double swivel. As mentioned above, the invention is applicable to double swivels. The swivel 100 of FIG. 6 is an example of the embodiment where the invention is applied to a double swivel. Similarly, the invention can be applied to a multiple swivel in which three or more main bodies are connected in series. In a multiple swivel, two adjacent main bodies are connected to each other by a connecting portion similar to the intermediate connecting portion 106. Multiple swivels are called as a triple swivel, a quadruple swivel, or a quintuple swivel, depending on the number of connected main bodies.

As described above, the fishing swivel 1 rotatably couples the main line 11 and the leader 13, and prevents twisting between the main line 11 and the leader 13 during use of the hook rig 12. Conventional swivels are not sufficient in terms of rotation performance and durability. Inventors of the application had performed various tests to seek a solution for this rotation performance and durability drawback and arrived at the present invention that can solve the drawbacks. Results of such tests are described below.

First, in order to improve the rotational performance of a swivel, tests were conducted in various modes. In tests to compare rotation performances of swivels, an upper part of a swivel was properly fixed, a sinker of No. 40 (about 150 g) was hung on the bottom of the swivel, and the sinker was rotated by an electric drill of 450 rpm until it reached 450 rpm. After the electric drill was removed from the swivel, the number of rotations of the swivel until rotation of the swivel completely was stopped was measured. The following swivels were used in the tests. Prepared were base materials used for D swivel SS rolling brass swivel size 8 (JAN code: 003049), size 5 (JAN code: 003063), and size 1 (JAN code: 003124), which were applicant's products commercially available. Table 1 below shows test results of the following seven swivels (1-1) to (1-7) for the number of rotations.

(1-1) A No. 8 size swivel having a fluororesin-containing plating layer 21 provided on the surface of the base material of the swivel (Example 1-1);

(1-2) A No. 8 size swivel in which the surface of the base material of the swivel was pickled with sulfuric acid for about 60 seconds (Reference Example 1-1);

(1-3) A No. 8 size swivel having a nickel plating layer formed on the surface of the base material of the swivel (Comparative Example 1-1);

(1-4) A double swivel made in the same manner as (1-3) (Comparative Example 1-2);

(1-5) A triple swivel made in the same manner as (1-3) (Comparative Example 1-3);

(1-6) A quintuple swivel made in the same manner as (1-3) (Comparative Example 1-4); and (1-7) A conventional ball-bearing type swivel (No. 0 size BB swivel with interlock, which is a product of Shimoda Gyogu Co., Ltd.) (Comparative Example 1-5).

Since the number indicating the size of a swivel is determined by individual manufacturer, swivels manufactured by different manufacturers do not necessarily have the same size even if they have the same number. In the above example, the No. 0 size BB swivel with interlock of Comparative Example 1-5 had substantially the same dimensions as the swivel of No. 8 of Example 1-1. Table 2 below shows test results of the following seven swivels (2-1) to (2-7) for the number of rotations.

(2-1) A No. 5 size swivel having a fluororesin-containing plating layer 21 provided on the surface of the base material of the swivel (Example 2-1);

(2-2) A No. 5 size swivel in which the surface of the base material of the swivel was pickled with sulfuric acid for about 60 seconds (Reference Example 2-1);

(2-3) A No. 5 size swivel having a nickel plating layer formed on the surface of the swivel base material (Comparative Example 2-1);

(2-4) A double swivel made in the same manner as (2-3) (Comparative Example 2-2);

(2-5) A triple swivel made in the same manner as (2-3) (Comparative Example 2-3);

(2-6) A quintuple swivel made in the same manner as (2-3) (Comparative Example 2-4); and (2-7) A conventional ball-bearing type swivel (No. 3 size BB swivel with interlock, which is a product of Shimoda Gyogu Co., Ltd.) (Comparative Example 2-5).

Table 3 below shows test results of the following seven swivels (3-1) to (3-6) for the number of rotations.

(3-1) A No. 1 size swivel having a fluororesin-containing plating layer 21 provided on the surface of the base material of the swivel (Example 3-1);

(3-2) A No. 1 size swivel in which the surface of the base material of the swivel was pickled with sulfuric acid for about 60 seconds (Reference Example 3-1);

(3-3) A No. 1 size swivel having a nickel plating layer formed on the surface of the swivel base material (Comparative Example 3-1);

(3-4) A double swivel made in the same manner as (3-3) (Comparative Example 3-2);

(3-5) A quintuple swivel made in the same manner as (3-3) (Comparative Example 3-3); and (3-6) A conventional ball-bearing type swivel (No. 5 size BB swivel with interlock, which is a product of Shimoda Gyogu Co., Ltd.) (Comparative Example 3-4).

TABLE 1

| Size | Item | Test 1 | Test 2 | Test 3 | Test 4 | Test 5 | Min. | Max. | Avg. |
|---|---|---|---|---|---|---|---|---|---|
| # 5 | Swivel (Fluororesin Plating) | 8.1 | 8.1 | 8.1 | 8.1 | 8.1 | 8.1 | 8.1 | 8.1 |
| | Swivel (Only pickled) | 6.6 | 7.6 | 9.7 | 5.2 | 7.7 | 5.2 | 9.7 | 7.4 |
| | Conventional Swivel | 5.6 | 5.4 | 8.2 | 6.3 | 7.1 | 5.4 | 8.2 | 6.5 |
| | Conventional Double Swivel | 5.2 | 5.5 | 5.8 | 5.1 | 5.6 | 5.1 | 5.8 | 5.4 |
| | Conventional Triple Swivel | 5.7 | 5.4 | 5.4 | 5.8 | 6.1 | 5.4 | 6.1 | 5.6 |
| | Conventional Quintuple Swivel | 5.4 | 4.9 | 5.3 | 6.2 | 6.0 | 4.9 | 6.2 | 5.6 |
| | Ball-bearing Swivel | 5.5 | 56.4 | 9.3 | 6.1 | 5.2 | 5.2 | 56.4 | 16.5 |

TABLE 2

Unit: Number Of Rotations

| Size | Item | Test 1 | Test 2 | Test 3 | Test 4 | Test 5 | Min. | Max. | Avg. |
|---|---|---|---|---|---|---|---|---|---|
| # 8 | Swivel (Fluororesin Plating) | 11.7 | 10.2 | 13.6 | 11.7 | 14.7 | 10.2 | 14.7 | 12.4 |
| | Swivel (Only pickled) | 10.5 | 11.5 | 11.0 | 10.0 | 13.5 | 10 | 13.5 | 11.3 |
| | Conventional Swivel | 1.9 | 1.6 | 1.8 | 1.8 | 1.6 | 1.6 | 1.9 | 1.7 |
| | Conventional Double Swivel | 8.2 | 9.3 | 9.2 | 9.0 | 7.8 | 7.8 | 9.3 | 8.7 |
| | Conventional Triple Swivel | 8.2 | 8.0 | 8.5 | 6.4 | 5.2 | 5.2 | 8.5 | 7.3 |
| | Conventional Quintuple Swivel | 7.2 | 9.3 | 6.4 | 6.7 | 7.8 | 6.4 | 9.3 | 7.5 |
| | Ball-bearing Swivel | 67.1 | 95.8 | 67.8 | 103.2 | 26.2 | 26.2 | 103.2 | 72.0 |

TABLE 3

| Size | Item | Test 1 | Test 2 | Test 3 | Test 4 | Test 5 | Min. | Max. | Avg. |
|---|---|---|---|---|---|---|---|---|---|
| # 1 | Swivel (Fluororesin Plating) | 4.1 | 4.5 | 4.7 | 5.3 | 5.2 | 4.1 | 5.3 | 4.8 |
| | Swivel (Only pickled) | 4.3 | 4.7 | 5.0 | 4.6 | 4.5 | 4.3 | 5.0 | 4.6 |
| | Conventional Swivel | 2.1 | 2.0 | 1.9 | 1.3 | 2.1 | 1.3 | 2.1 | 1.9 |
| | Conventional Double Swivel | 3.5 | 3.1 | 2.6 | 3.2 | 3.2 | 2.6 | 3.5 | 3.1 |
| | Conventional Quintuple Swivel | 3.4 | 3.0 | 2.8 | 3.2 | 3.7 | 2.8 | 3.7 | 3.2 |
| | Ball-bearing Swivel | 97.3 | 75.0 | 119.1 | 104.6 | 85.5 | 75.0 | 119.1 | 96.3 |

Tables 1 to 3 show the results of the rotation tests performed on each of the above swivels. Specifically, for each swivel, the number of rotations in each test, the minimum number of rotations in the tests, the maximum number of rotations in the tests, and the average number of rotations are shown in order in each table. Table 1 shows the minimum number of rotations, the maximum number of rotations, and the average number of rotations for the seven types of swivels, Example 1-1, Reference Example 1-1, and Comparative Example 1-1 to Comparative Example 1-5 prepared as described above. Table 2 shows the minimum number of rotations, the maximum number of rotations, and the average number of rotations for the seven types of swivels, Example 2-1, Reference Example 2-1, and Comparative Example 2-1 to Comparative Example 2-5 prepared as described above. Table 3 shows the minimum number of rotations, the maximum number of rotations, and the average number of rotations for the seven types of swivels, Example 3-1, Reference Example 3-1, and Comparative Example 3-1 to Comparative Example 3-4 prepared as described above.

As shown in Table 1, the average number of rotations of the swivel of Example 1-1 was 12.4, and the average number of rotations of the swivel of Reference Example 1-1 was 11.3. It was found that the swivel of Example 1 was able to make the contact portion smoother by having the fluorine-containing resin plating layer as the outermost layer. It was also found that the swivel of Example 2 also exhibited a fine rotation performance.

The swivel rotation performance of Example 1-1 and Reference Example 1-1 were compared with that of the comparative example. The average number of rotations of the swivel of Comparative Example 1-1 was 1.7, which was significantly smaller than 12.4 of Example 1-1. The average number of rotations of the swivel of Reference Example 1-1 was 11.3, and it was found that the swivel of Reference Example 1-1 also had a higher rotation performance than the swivel of Comparative Example 1-1.

The average number of rotations of the swivel (double swivel) of Comparative Example 1-2 was 8.7, the average number of rotations of the swivel (triple swivel) of Comparative Example 1-3 was 7.3, and the average number of rotations of the swivel (quintuple swivel) of Comparative Example 1-4 was 7.5. As described above, it was found that even conventional swivels having no fluororesin-containing plating layer as the outermost layer could have good rotation performance when they were made as multiple swivels.

The average number of rotations of the swivel of Reference Example 1-1 was 12.4, and it was found that the swivel of Reference Example 1-1 had a higher rotation performance than the conventional multiple swivels.

As described above, it was found that the swivels according to the present invention exhibited excellent rotation performance. It was also found that the swivel of Reference Example 1-1 also exhibited fine rotation performance. The ball-bearing type swivel of Comparative Example 1-5 exhibited a high rotation performance, but its manufacturing cost is high as described later.

The above-described tendency was generally applicable to the results of the rotational performance tests shown in Tables 2 and 3. As mentioned above, it was found from the above test results that the swivels according to the embodiment of the invention exhibited excellent rotation performance.

Next, in order to improve the durability of a swivel, tests were conducted in various modes. In the tests to compare the durability, the upper part of a swivel was fixed to a drill press, the sinker of No. 150 (about 563 g) was hung on the lower part of the swivel, and a side of the sinker was held by a jig so that the sinker did not rotate. The swivel was rotated by the drill press at 430 rpm while the weight of the sinker pulled the swivel downward, and a wear fall time (seconds), which is the time until the main body of the swivel comes off the connecting portion due to wear, and the number of rotations until the main body of the swivel came off the connecting portion due to wear were measured. Results of the tests are shown below.

TABLE 4

| Comparison of No. 8 Swivels | | Wear Fall Time (Seconds) | | | | | Number of Rotations Till Fall Due To Wear | | | | | |
| --- | --- | --- | --- | --- | --- | --- | --- | --- | --- | --- | --- | --- |
| # Item | Test 1 | Test 2 | Test 3 | Test 4 | Test 5 | Avg. | Test 1 | Test 2 | Test 3 | Test 4 | Test 5 | Avg. |
| 8 Swivel (Fluororesin Plating) | 14,888 | 10,151 | 19,800 | 5,800 | 17,473 | 13,622 | 106,697 | 72,749 | 141,900 | 41,567 | 125,223 | 97,627 |
| Swivel (Only pickled) | 337 | 418 | 379 | 415 | 413 | 393 | 2,415 | 2,996 | 2,716 | 2,981 | 2,960 | 2,814 |
| Conventional Swivel | 349 | 385 | 314 | 381 | 416 | 369 | 2,501 | 2,759 | 2,250 | 2,731 | 2,981 | 2,645 |
| Conventional Double Swivel | 2,662 | 3,276 | 3,335 | 3,163 | 3,190 | 3,125 | 19,078 | 23,478 | 23,901 | 22,668 | 22,862 | 22,397 |
| Conventional Quint, Swivel | 12,538 | 8,566 | 6,959 | 6,760 | 9,222 | 8,809 | 89,856 | 61,390 | 49,873 | 48,447 | 66,091 | 63,131 |

TABLE 5

| Comparison of No. 5 Swivels | | Wear Fall Time (Seconds) | | | | | Number of Rotations Till Fall Due To Wear | | | | | |
| --- | --- | --- | --- | --- | --- | --- | --- | --- | --- | --- | --- | --- |
| # Item | Test 1 | Test 2 | Test 3 | Test 4 | Test 5 | Avg. | Test 1 | Test 2 | Test 3 | Test 4 | Test 5 | Avg. |
| 5 Swivel (Fluororesin Plating) | 86,400 | 76,512 | 63,049 | 10,489 | 85,589 | 64,408 | 619,200 | 548,336 | 451,851 | 75,171 | 61,338 | 233,782 |
| Swivel (Only pickled) | 809 | 793 | 535 | 803 | 597 | 707 | 5,798 | 5,683 | 3,834 | 5,755 | 4,279 | 5,070 |
| Conventional Swivel | 709 | 732 | 768 | 734 | 759 | 740 | 5,081 | 5,246 | 5,504 | 5,260 | 5,440 | 19,872 |
| Conventional Double Swivel | 8,022 | 10,507 | 8,107 | 6,389 | 10,418 | 8,689 | 57,491 | 75,300 | 58,100 | 45,788 | 74,662 | 62,268 |
| Conventional Quint, Swivel | 14,155 | 13,179 | 12,850 | 9,808 | 12,288 | 12,456 | 101,444 | 95,450 | 92,092 | 70,291 | 88,064 | 89,268 |

TABLE 6

| | | Wear Fall Time (Seconds) | | | | | | Number of Rotations Till Fall Due To Wear | | | | |
|---|---|---|---|---|---|---|---|---|---|---|---|---|
| Comparison of No. 1 Swivels | | | | | | | | | | | | |
| # | Item | Test 1 | Test 2 | Test 3 | Test 4 | Test 5 | Avg. | Test 1 | Test 2 | Test 3 | Test 4 | Test 5 |
| 1 | Swivel (Fluororesin Plating) | 49,707 | 75,633 | 12,990 | 32,730 | 17,274 | 37,707 | 356,234 | 543,470 | 93,095 | 234,565 | 123,797 270,232 |
|  | Swivel (Only Pickled) | 3,512 | 3,241 | 3,778 | 3,676 | 3,195 | 3,480 | 25,169 | 23,227 | 27,076 | 26,345 | 22,898 24,943 |
|  | Conventional Swivel | 2,904 | 2,662 | 2,650 | 2,105 | 2,316 | 2,527 | 20,812 | 19,078 | 18,992 | 15,086 | 16,598 18,113 |
|  | Conventional Double Swivel | 31,526 | 38,843 | 33,975 | — | — | 34,781 | 225,936 | 278,375 | 243,488 | — | — 249,266 |
|  | Conventional Quint, Swivel | 42,361 | 27,235 | 23,439 | 59,921 | — | 38,239 | 303,587 | 195,184 | 167,980 | 429,434 | — 274,046 |

Results of tests for wear resistance of swivels will be described with reference to Tables 4 to 6. Table 4 shows a wear fall time (seconds) and the number of rotations until the swivel breaks and fall due to wear for the five types of swivels, Example 1-1, Reference Example 1-1, Comparative Example 1-1, Comparative Example 1-2, and Comparative Example 1-4 manufactured as described above. Table 5 shows the wear fall time (seconds) and the number of rotations until the swivel breaks and fall due to wear for the five types of swivels, Example 2-1, Reference Example 2-2, Comparative Example 2-1, Comparative Example 2-2, and Comparative Example 2-4. Table 5 shows the wear fall time (seconds) and the number of rotations until the swivel breaks and fall due to wear for the five types of swivels, Example 3-1, Reference Example 3-2, Comparative Example 3-1, Comparative Example 3-2, and Comparative Example 3-3.

As shown in Table 4, the average fall time of the swivel of Example 1-1 was 13622 seconds, and the average number of rotations thereof was 97627. The average fall time of the swivel of Reference Example 1-1 was 393 seconds, and the average number of rotations thereof was 2814. As described above, the swivel of Example 1-1 was provided with the fluororesin-containing plating layer as the outermost layer and the contact portion is protected by the fluororesin-containing plating layer, so that the swivel of Example 1-1 exhibited a remarkably better wear resistance performance than that of the swivel of Reference Example 1-1.

The durability of the swivel of Example 1-1 was compared with that of the conventional swivels. As shown in Table 4, the average fall time of the swivel of Comparative Example 1-1 was 369 seconds, and the average number of rotations thereof was 2645. The average fall time of the swivel of Reference Example 1-2 was 393 seconds, and the average number of rotations thereof was 2814. Accordingly, it was found that the swivel of Example 1-1 and the swivel of Reference Example 1-1 had higher wear resistances than the swivel of Comparative Example 1-1.

The average fall time of the swivel (double swivel) of Comparative Example 1-2 was 3125 seconds, and the average number of rotations thereof was 22397. The average fall time of the swivel (quintuple swivel) of Comparative Example 1-4 was 8809 seconds, and the average number of rotations thereof was 63131. As described above, it was found that even conventional swivels could have good durability when they were made as multiple swivels. This may be because the multiple swivels include two or more main bodies so that the frictional force caused during rotation is distributed to the two or more main bodies and their wear speed in each main body is reduced.

Although not shown in Table 4, it was confirmed that a multiple swivel manufactured in the same manner as Example 1-1 showed higher abrasion resistance than that of Example 1-1.

The above-described tendency was generally applicable to the results of the durability tests shown in Tables 5 and 6. From the above, it was found that the swivels according to the embodiment of the invention can achieve fine durability.

The costs of the swivels were compared. Table 7 shows manufacturing costs of the six types of swivels, Example 1-1, Reference Example 1-1, Comparative Example 1-1, Comparative Example 1-2, Comparative Example 1-4, and Comparative Example 1-5. The cost of each swivel in Table 7 is shown in a relative man-hour for each swivel manufactured relative to the swivel of Comparative Example 1-1 where the man-hour thereof is 1.

TABLE 7

| Item | Cost |
|---|---|
| Swivel (Fluororesin Plating) | 1.6 |
| Swivel (Only Pickled) | 1.4 |
| Conventional Swivel | 1 |
| Conventional Double Swivel | 2 |
| Conventional Quituple Swivel | 4 |
| Ball-bearing Swivel | 3 |

It was found that the (ball bearing type) swivel of Comparative Example 1-5 was excellent in rotation performance, but the cost was three times as much as that of the swivel of Comparative Example 1, which was very expensive. Further, it was found that the swivel of Comparative Example 1-4 (quintuple swivel) also had good rotation performance and durability, but was four times as expensive as the swivel of Comparative Example 1-1.

The cost of the swivel (double swivel) of Comparative Example 1-2 was about 2, which was lower than the (ball bearing type) swivel of Comparative Examples 1-5 and the quintuple swivel of Comparative Examples 1-4 (five swivels connected). However its rotation performance and durability were not sufficient as described above.

Whereas the swivel of Example 1-1 had a cost of about 1.6, and the swivel of Reference Example 1-1 had a cost of about 1.4. It is considered that a desirable cost of a swivel is about 1.3 to 1.8 times that of the swivel of Comparative Example 1-1. The swivel of Example 1-1 costs about 1.6 times as much as the swivel of Comparative Example 1-1. From the comparison of the costs of the respective swivels, it was found that the swivel of Example 1-1 had excellent rotation performance and durability, and it can be manufactured at a significantly lower cost compared to the quintuple swivel of Comparative Examples 1-4 and the (ball bearing type) swivel of Comparative Example 1-5.

Embodiments of the invention are not limited to the above-described embodiments, and various modifications can be made without departing from the scope of the invention.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

LIST OF REFERENCE NUMBERS 1, 100 fishing swivel
2 first connecting portion
3 second connecting portion
4 main body
5 first contact portion
6 second contact portion
7 main body contact portion
11 main fishing line
12 hook rig
13 leader
14 snap
15 convex portion
20 base plating layer
21 fluororesin-containing plating layer

What is claimed is:

1. A fishing swivel for connecting a main fishing line and a leader, comprising:
    a first connecting portion connected with the main line;
    a second connecting portion connected with the leader; and
    a main body rotatably coupled to the first connecting portion and the second connecting portion,
    wherein the first connecting portion has a first contact portion that contacts the main body,
    wherein the second connecting portion has a second contact portion that contacts the main body,
    wherein the main body has a main body contact portion that contacts the first contact portion and the second contact portion, and
    wherein a plating layer containing fluororesin is respectively provided on surfaces of the first contact portion, the second contact portion, and the main body contact portion,
    wherein an outer peripheral surface of the first connecting portion or the second connecting portion includes at least one convex portion formed thereon, the at least one convex portion extending upwardly and outwardly from the outer peripheral surface of the first connecting portion or the second connecting portion,
    wherein a portion of the at least one convex portion of the first connecting portion or the second connecting portion is configured to serve as the first contact portion or the second contact portion, and
    wherein thicknesses of the plating layer on the surfaces of the first contact portion or the surfaces of the second contact portion are greater than thicknesses of the plating layer in other portions of the first connecting portion or the second connecting portion.

2. The fishing swivel of claim 1, wherein the surfaces of the first contact portion, the second contact portion, and the main body contact portion are pickled.

3. The fishing swivel according to claim 1, wherein the main body is formed in a tubular shape.

4. The fishing swivel according to claim 1, wherein the main body contact portion is formed on an inner peripheral surface of the main body,
    wherein the first contact portion is formed on an outer peripheral surface of the first connecting portion, and
    wherein the second contact portion is formed on an outer peripheral surface of the second connecting portion,
    wherein the first contact portion and the second contact portion rotatably contact the inner peripheral surface of the main body.

5. The fishing swivel according to claim 1, wherein the main body contact portion is formed at each end of the main body, and
    wherein each end of the main body is formed such that the end surrounds the first contact portion or the second contact portion.

6. The fishing swivel according to claim 1, wherein the plating layer is also provided on a surface of the first connection portion other than the first contact portion, a surface of the second connection portion other than the second contact portion, and a surface of the main body other than the main body contact portion.

7. The fishing swivel according to claim 1, wherein the plating layer is also provided on a surface of the main body contact portion.

8. The fishing swivel according to claim 1, wherein the fluororesin contained in the plating layer is PTFE.

9. The fishing swivel according to claim 1, wherein the at least one convex portion includes a stepped configuration.

10. The fishing swivel according to claim 1, wherein the at least one convex portion is configured to reduce the contact area between the main body contact portion of the main body and the first contact portion of the first connecting portion so as to reduce rotational resistance between the main body and the first connection portion and/or is configured to reduce the contact area between the main body contact portion of the main body and the second contact portion of the second connecting portion so as to reduce rotational resistance between the main body and the second connection portion.

11. The fishing swivel according to claim 1, wherein the corner is a convex corner at a vertex of two adjacent sides of the at least one convex portion with an angle of 90-degree therebetween.

12. The fishing swivel according to claim 1, wherein the portion of the at least one convex portion includes a corner, and
    wherein the corner is configured to contact the main body.

13. The fishing swivel according to claim 1, wherein the first connecting portion, the second connecting portion, and the main body are made of metal.

14. The fishing swivel of claim 13, wherein the first connecting portion, the second connecting portion, and the main body are made of brass or stainless steel.

15. A fishing swivel, comprising:
    a first connecting portion connected with a fishing main line;
    a first main body rotatably coupled to the first connecting portion;
    a second connecting portion connected with a leader;
    a second main body rotatably coupled to the second connecting portion; and
    an intermediate connecting portion connecting the first main body and the second main body,
    wherein the first connecting portion has a first contact portion that contacts the first main body,
    wherein the first contact portion extending upwardly and outwardly from the outer peripheral surface of the first connecting portion, wherein the second connecting portion has a second contact portion that contacts the second main body, wherein the second contact portion extending upwardly and outwardly from the outer peripheral surface of the second connecting portion, wherein the intermediate connection portion has a third contact portion that contacts the first main body and a fourth contact portion that contacts the second main body, wherein the first main body has a first main body portion contact portion that contacts the first contact portion and the third contact portion, and wherein the second main body has a second main body portion contact portion that contacts the second contact portion and the fourth contact portion, wherein a plating layer containing fluororesin is provided on surfaces of the first contact portion, the second contact portion, the third contact portion, the fourth contact portion, the first main body contact portion, and the second main body contact portion, and wherein thicknesses of the plating layer on the surfaces of the first contact portion, the surfaces of the second contact portion, the surfaces of the third contact portion, or the surfaces of the fourth contact portion are greater than thicknesses of the plating layer in other portions of the first contact portion, the second contact portion, the third contact portion or the fourth contact portion.

* * * * *

UNITED STATES PATENT AND TRADEMARK OFFICE
CERTIFICATE OF CORRECTION

Page 1 of 1

PATENT NO. : 11,382,320 B2
APPLICATION NO. : 16/959851
DATED : July 12, 2022
INVENTOR(S) : Okishima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 103 days.

Signed and Sealed this
Eleventh Day of February, 2025

Coke Morgan Stewart
*Acting Director of the United States Patent and Trademark Office*